July 29, 1969 G. KLEIN 3,458,729

WAVEFORM GENERATOR

Filed Feb. 1, 1967 2 Sheets-Sheet 1

INVENTOR.
GERRIT KLEIN
BY
[signature]
AGENT

July 29, 1969 G. KLEIN 3,458,729

WAVEFORM GENERATOR

Filed Feb. 1, 1967 2 Sheets-Sheet 2

INVENTOR.
GERRIT KLEIN
BY
Frank R. Trifari
AGENT

1

3,458,729
WAVEFORM GENERATOR

Gerrit Klein, Emmasingel, Eindhoven, Netherlands, assignor, by mesne assignments, to U.S. Philips Corporation, New York, N.Y., a corporation of Delaware
Filed Feb. 1, 1967, Ser. No. 613,161
Claims priority, application Netherlands, Feb. 9, 1966, 6601606
Int. Cl. H03k *5/00;* H03b *5/00;* G06g *7/12*
U.S. Cl. 307—261 9 Claims

ABSTRACT OF THE DISCLOSURE

A waveform generator comprises a differential amplifier. First and second control voltages, at least one of which exhibits a periodic waveform, are supplied to the control electrodes thereof. A resistor—diode network which exhibits an impedance variation which is a given function of the voltages applied thereto is connected to one pair of common electrodes of the amplifier. Various waveforms can be developed at the output electrodes of the differential amplifier depending on the type of network used and the input waveforms supplied thereto.

The present invention relates to an apparatus for generating sinusoidal or other periodic waveforms. More particularly, the invention relates to a device for producing a first periodic voltage comprising at least two amplifier elements having a first pair of similar main electrodes that are connected together and, through a current source circuit, to a terminal of a supply source. A second and a third voltage, at least one of which is periodic, are applied to the respective control electrodes of the amplifier elements and the desired first periodic voltage is formed in a device connected to the second pair of main electrodes.

In a known device of this type, a triangular voltage is produced if sinusoidal voltages having different frequencies are applied to the control electrodes. In a similar manner a sinusoidal voltage can be obtained from two triangular voltages. Other mixing products of two voltages presented to the control electrodes of the amplifier elements are also imaginable. If, for example, a triangular voltage is applied to one of the control electrodes and a suitable direct voltage is applied to the other control electrode, one half of a sinusoidal voltage may be formed at the output. In particular, in connection with the generation of sinusoidal voltages having a very constant amplitude over a large frequency range, the use of such a known device is of great advantage because the required delta voltages can be very accurately produced with great amplitude stability and over a large frequency range in a known device destined for that purpose. In addition, a sinusoidal voltage produced in this manner does not exhibit the transient switching phenomena which can be annoying at low frequencies.

Other known devices use the current-voltage characteristic of non-linear elements, for example, a field effect transistor. However, in this case the distortion that occurs is not negligible.

Devices are also known in which, in order to produce certain voltage waveforms, a non-linear resistor, obtained by means of resistors and diodes, is used as a switch. However, in this case, to obtain a good result, it is necessary that the resistors be accurately calibrated, for example, to an accuracy of less than 1%, and the readily defined auxiliary voltages and a double construction for the positive and negative cycles be used.

It is an object of the invention to provide a device for producing a periodic voltage in which very small distortions, for example, 0.1% occur and in which resistors having standardized values and wide tolerance limits (for example, up to 10%) can be used, in which the auxiliary voltages need meet only moderate requirements and in which a double construction is not required in order to obtain a positive and a negative half of a complete cycle of a periodic voltage. The invention is characterized in that the conductance in the circuit of the first pair of similar main electrodes traverses a given function dependent upon the voltage at these electrodes. In order to vary the conductance in this manner, the first pair of similar main electrodes is connected to an impedance which is composed of a number of parallel-arranged diode-resistor branches, and wherein other resistors are arranged between the branches on the side thereof remote from the first pair of main electrodes. The latter resistors are energized in series from a voltage source.

In order that the invention may readily be carried into effect, it will now be described in greater detail, by way of example, with reference to the accompanying figures, in which.

Figure 1:
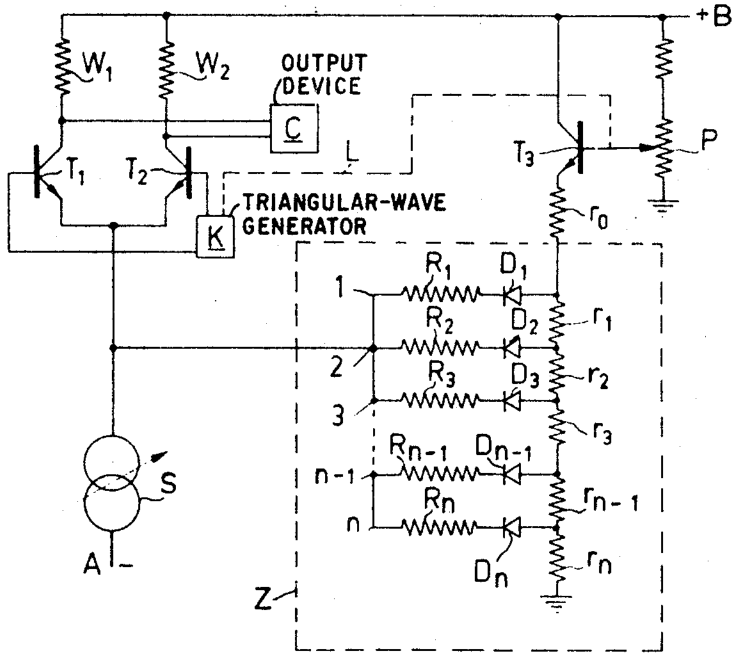
FIGURE 1 is a circuit diagram of a device according to the invention.

In FIGURE 1, $T_1$ and $T_2$ denote two transistor amplifier elements connected in common emitter configuration. The emitters are connected to a terminal A of a supply source through a current source circuit S. The internal resistance of the current source circuit S is large with respect to the emitter input resistance of the transistors $T_1$ and $T_2$ and is also large with respect to an impedance Z which is likewise connected to the emitters. The impedance Z consists of a number of parallel-arranged diode-resistor branches, 1, 2 . . . *n*, and a group of series resistors $r_1$, $r_2$ . . . $r_n$ connected between the branches on the side remote from the emitters. These interposed resistors $r_1$, $r_2$ . . . $r_n$ together with a resistor $r_o$ constitute a series circuit which is connected on one side to a terminal of a voltage source denoted by a transistor $T_3$, and, on the other side, is connected to a point of constant potential. The internal resistance of the voltage source is small with respect to the resistance determined by the impedance Z. The resistors of the respective branches 1, 2 . . . *n* are denoted by $R_1$, $R_2$ . . . $R_n$ and the respective diodes are denoted by $D_1$, $D_2$ . . . $D_n$. The collectors of each of the transistors $T_1$ and $T_2$ are connected to a terminal B of a voltage supply source through equal resistors $W_1$ and $W_2$, respectively. The collector of the transistor $T_3$ is directly connected to the positive terminal of the voltage source. A voltage source K supplies control voltages to the control electrodes of the transistors $T_1$ and $T_2$, at least one of which is periodic. The desired periodic voltage is obtained at the collectors of these transistors and is applied to an output device C. The control electrode of the transistor $T_3$ is connected to an arm of a potentiometer P which is connected to the terminal B of a supply source and to a point of constant potential. The operation of the device according to the invention will be described with reference to an example in which starting from two delta voltages a sinusoidal voltage is produced, although the invention is not restricted to the same. Other voltages, for example, sinusoidal voltages having different frequencies, if desired, and the like, may also be used as the starting point to obtain given voltage waveforms.

Figure 2:
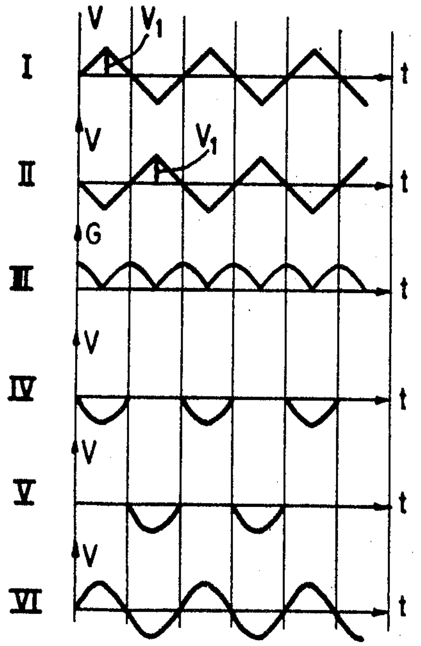
FIGURE 2 shows the various voltage waveforms which occur in a given case.

FIGURE 2 shows the various voltage waveforms which occur at given points of the circuit shown in FIGURE 1 in this special example. Curves I and II illustrate triangular voltages V, having a peak value $V_1$, which are applied in opposite phase from source K to the base electrodes of the transistors $T_1$ and $T_2$, respectively. The various branches of the impedance Z are arranged in a pattern so that the conductance G in the emitter circuit of the transistors $T_1$ and $T_2$ varies proportionally to cos $x$, where $x=V/V_1$. Curve III shows the variation of the conductance G as a function of time. Since the triangular voltages I and II at the base electrodes of transistors $T_1$ and $T_2$ are out of phase, only one transistor conducts during each half cycle and the circuit operates as an emitter follower. As a result, the current through the alternately conductive transistors $T_1$ or $T_2$ is proportional to sin $x$. In FIGURE 2, curves IV and V show the collector voltage waveforms of transistors $T_1$ and $T_2$, respectively. In this manner, a half-cycle voltage is formed alternately at each of the collectors which is proportional to sin $x$. In a device C, the half sine waves are combined into one normal sinewave voltage, as shown in curve VI. Initially, at zero signal, only the resistor $R_n$ will be decisive of the value of the impedance Z because all the diodes are conductive at that time. As the voltage at the emitter circuit increases, successively the diodes $D_n$, $D_{n-1}$ . . . $D_1$ will no longer be conductive if the voltage on the side remote from the common emitter circuit is a lower or at least equal voltage. The current supplied by the voltage source denoted by the transistor $T_3$ produces a series of decreasing voltages across the series resistors $r_o$, $r_1$ . . . $r_n$ in a manner such that the respective diodes $D_n$, $D_{n-1}$ . . . $D_n$ are cut off at the correct instant. As a result, the impedance Z varies in accordance with the resistance values of the resistors $R_n$, $R_{n-1}$ . . . $R_1$ which are much larger than the resistors $r_n$, $r_{n-1}$ . . . $r_o$ in combination with the voltage conditions on either side of the respective branches 1, 2, 3 . . . *n*.

In order to obtain the said cosinusoidal variation of the impedance Z, the resistors $R_1$, $R_2$ . . . $R_n$ and $r_o$, $r_1$, $r_2$ . . . $r_n$ must have values which are specially chosen for this purpose.

The resistance values for a circuit giving good results and an accuracy better than approximately 10% is given below. The values given are for an impedance Z having 20 branches. However, more or less branches may be utilized, depending on the accuracy desired.

| | |
|---|---|
| $R_1$=56KΩ | $r_o$=11Ω |
| $R_2$=39KΩ | $r_1$=11Ω |
| $R_3$=30KΩ | $r_2$=22Ω |
| $R_4$=24KΩ | $r_3$=22Ω |
| $R_5$=20KΩ | $r_4$=33Ω |
| $R_6$=20KΩ | $r_5$=33Ω |
| $R_7$=15KΩ | $r_6$=33Ω |
| $R_8$=12KΩ | $r_7$=56Ω |
| $R_9$=12KΩ | $r_8$=56Ω |
| $R_{10}$=13KΩ | $r_9$=56Ω |
| $R_{11}$=15KΩ | $r_{10}$=56Ω |
| $R_{12}$=15KΩ | $r_{11}$=56Ω |
| $R_{13}$=16KΩ | $r_{12}$=56Ω |
| $R_{14}$=18KΩ | $r_{13}$=56Ω |
| $R_{15}$=20KΩ | $r_{14}$=56Ω |
| $R_{16}$=22KΩ | $r_{15}$=56Ω |
| $R_{17}$=27KΩ | $r_{16}$=56Ω |
| $R_{18}$=33KΩ | $r_{17}$=56Ω |
| $R_{n-a}$=43KΩ | $r_{18}$=56Ω |
| $R_n$=47KΩ | $r_{n-1}$=56Ω |
| | $r_n$=112Ω |

With the circuit described, sinusoidal voltages having a constant amplitude over a large frequency range can simply be realized with distortions smaller than 0.1%.

The current source S, shown in FIGURE 1, which may be adjustable, compensates for the quiescent current always present in the circuit, so that no distortion occurs as a result of this.

Figure 3:
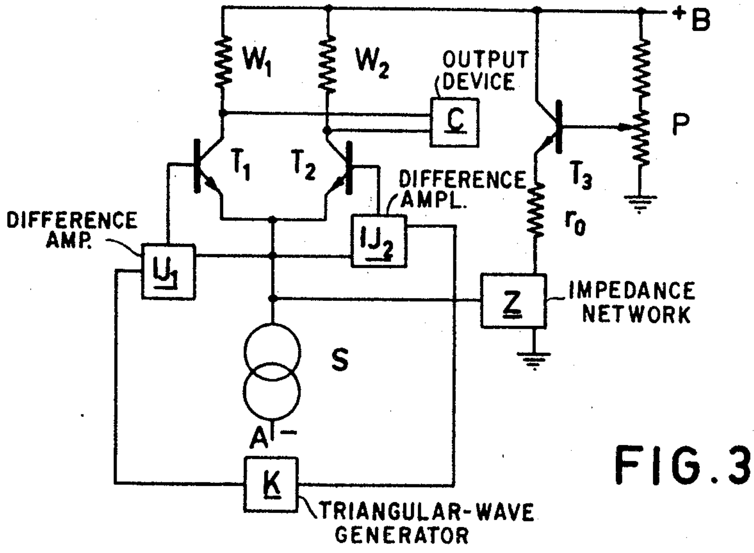
FIGURE 3 is a modified form of the invention shown in FIGURE 1.

In FIGURE 1, a potentiometer P for adjusting the correct voltage division between the series resistors $r_o$, $r_1$ . . . $r_n$ is connected to the base electrode of the transistor $T_3$. The base voltage of transistor $T_3$ is adjusted so that all of the diodes $D_1$ to $D_n$ are cut off when the triangular voltage at the emitter electrodes of transistors $T_1$ and $T_2$ attains its maximum value. Thus, the base voltage of transistor $T_3$ must be nearly equal to the amplitude $V_1$ of the triangular voltage at said emitter electrodes. Alternatively, this adjustment may be derived, for example, in known manner from the D.C. voltage that determines the amplitude of the triangular voltage at a control electrode of one of the transistors $T_1$ or $T_2$ This is indicated by the broken line connection L of FIGURE 1. It is to be noted that silicon diodes in the branches 1, 2 . . . *n* give good results because the leakage currents in the cut-off condition are very small. In proportioning the potentiometer made up of the resistors $r_o$, $r_1$ . . . $r_n$ the voltage of approximately 0.5 volt at which the Si diode switches must be taken into account. The switch-over region of the currents in the transistors $T_1$ and $T_2$ should be kept as small as possible. The use of germanium transistors gives a sufficient guarantee. In connection with the latter, it is to be noted that said switch-over can be improved by a circuit as shown in FIGURE 3. The circuit shown in FIGURE 3 constitutes an extension of the circuit shown in FIGURE 1 in that two difference amplifiers $IJ_1$ and $IJ_2$ are included in the circuit. The inputs of each of these difference amplifiers are connected to the outputs of the control signal source K and the common point of the emitter of the transistor pair $T_1$ and $T_2$, respectively. The output terminals of the difference amplifiers $IJ_1$ and $IJ_2$ are connected to the control electrodes of the transistors $T_1$ and $T_2$, respectively.

In this manner it is achieved that the voltage at the emitters of the two transistors $T_1$ and $T_2$ very accurately follows the control voltages which are presented from the control signal source K. As a result, the switch-over difficulties which may arise in the periodic switching of the transistors $T_1$ and $T_2$ are eliminated.

What is claimed is:

1. A device for producing a first periodic voltage comprising, first and second amplifier elements, each of said amplifier elements having a control electrode and corresponding first and second main electrodes, means connecting said pair of similar first main electrodes together and through a current source circuit to a terminal of a voltage supply source, a second and a third voltage source, at least one of which is periodic, means for coupling said second and third voltage sources to the respective control electrodes of said first and second amplifier elements, a device connected to the pair of second main electrodes of the amplifier elements for deriving said first periodic voltage, an impedance element connected to the pair of similar first main electrodes comprising a number of parallel-arranged diode-resistor branches arranged in a pattern such that the conductance in the circuit of said pair of first main electrodes exhibits a variation that is a function of the voltage at said electrodes, a plurality of resistors arranged between said branches on the side thereof remote from the pair of first main electrodes, and means for energizing the latter resistors in series from the voltage source.

2. A device for producing a sinusoidal voltage as claimed in claim 1 wherein said second and third voltage sources supply triangular waveform voltages of opposite phase to the control electrodes of the amplifier elements, said diodes and resistors of the diode-resistor network being chosen so that the conductance in the circuit of the first pair of similar main electrodes exhibits a cosinusoidal variation as a function of the voltage at said main electrodes.

3. A device as claimed in claim 1 further comprising a potentiometer for adjusting the magnitude of the energizing voltage supplied to the diode-resistor network.

4. A device as claimed in claim 3 wherein the adjustment of the potentiometer is controlled by the voltage at a control electrode of one of the amplifier elements.

5. A device as claimed in claim 1 further comprising a pair of difference amplifiers each having a pair of input terminals and an output terminal, means connecting said second and third voltage sources to one input terminal of each of the respective difference amplifiers, means connecting the other input terminal of each of the respective difference amplifiers to the first pair of similar main electrodes of the two amplifier elements, and means connecting the output terminal of the respective difference amplifiers to the respective control electrodes of the amplifier elements.

6. Apparatus for generating a periodic signal having a given waveform comprising, voltage supply means, first and second amplifier elements each having a control electrode and corresponding first and second main electrodes, means connecting said first electrodes together and to one terminal of said supply means, means individually connecting said second electrodes to the other terminal of said supply means, means for supplying first and second control signals to the control electrodes of said first and second amplifier elements, respectively, at least one of said control signals being a periodic signal, output means coupled to said second main electrodes, and impedance means coupled to said pair of first main electrodes comprising, a plurality of diodes, a first plurality of resistors, means connecting said resistors and diodes in individual series circuits, means connecting one terminal of each of said series circuits together and to said pair of first main electrodes, a second plurality of resistors connected in series across said voltage supply means, and means connecting the other terminals of said series circuits to individual tap points along said series of resistors so that the conductance of said impedance means varies in a predetermined manner with the signal at said main electrodes.

7. Apparatus as claimed in claim 6 wherein said control signal supply means is arranged to supply first and second triangular waveform signals that are out of phase and said first and second groups of resistors are arranged in a pattern so that the conductance of said impedance means varies as the cosine of the voltage at said pair of first main electrodes.

8. Apparatus as claimed in claim 6 wherein said amplifier elements comprise transistors and said first and second electrodes are the emitter and collector electrodes, respectively, of the transistors.

9. Apparatus for generating a sinusoidal signal comprising, voltage supply means, first and second amplifier elements each having a control electrode and corresponding first and second main electrodes, means connecting said first electrodes together and to one terminal of said supply means, means individually connecting said second electrodes to the other terminal of said supply means, means for supplying triangular waveform signals of opposite phase to said control electrodes so that said amplifier elements conduct current during alternate time intervals, impedance means comprising a plurality of parallel impedance branches connected at one end to said first main electrodes, each of said branches comprising a resistor and diode connected in series, a voltage divider connected across said voltage supply means, and means connecting the other ends of said impedance branches to tap points on said voltage divider, said impedance branches and said voltage divider being arranged in a pattern so that the conductance of said impedance means varies as the cosine of the voltage at said first main electrodes, and output means coupled to said second main electrodes for combining the signals produced thereat to derive said sinusoidal signal.

References Cited

UNITED STATES PATENTS 3,215,860 11/1965 Neumann -------- 307—261 X
3,350,575 10/1967 Crouse ------------ 328—27 X ROY LAKE, Primary Examiner S. H. GRIMM, Assistant Examiner U.S. Cl. X.R.

307—229, 268; 328—27, 36; 331—75